United States Patent
He et al.

(10) Patent No.: US 10,719,507 B2
(45) Date of Patent: Jul. 21, 2020

(54) SYSTEM AND METHOD FOR NATURAL LANGUAGE PROCESSING

(71) Applicant: SayMosaic Inc., Palo Alto, CA (US)

(72) Inventors: Cheng He, Palo Alto, CA (US); Jian Jin, Santa Barbara, CA (US)

(73) Assignee: SayMosaic Inc., Palo Alto, CA (US)

( * ) Notice: Subject to any disclaimer, the term of this patent is extended or adjusted under 35 U.S.C. 154(b) by 246 days.

(21) Appl. No.: 15/711,098

(22) Filed: Sep. 21, 2017

(65) Prior Publication Data
US 2019/0087455 A1 Mar. 21, 2019

(51) Int. Cl.
*G06F 40/30* (2020.01)
*G06F 16/242* (2019.01)
*G10L 15/22* (2006.01)
*G10L 15/16* (2006.01)
*G06F 16/332* (2019.01)
*G06F 16/2452* (2019.01)
*G06F 16/2457* (2019.01)
*G06F 40/35* (2020.01)
*G06F 40/253* (2020.01)
*G06F 40/284* (2020.01)
*G06F 40/295* (2020.01)

(52) U.S. Cl.
CPC ...... *G06F 16/243* (2019.01); *G06F 16/24522* (2019.01); *G06F 16/24575* (2019.01); *G06F 16/3329* (2019.01); *G06F 40/253* (2020.01); *G06F 40/284* (2020.01); *G06F 40/295* (2020.01); *G06F 40/30* (2020.01); *G06F 40/35* (2020.01); *G10L 15/16* (2013.01); *G10L 15/22* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
USPC .................................................. 704/1, 9, 10
See application file for complete search history.

(56) References Cited

U.S. PATENT DOCUMENTS

| | | | |
|---|---|---|---|
| 6,901,399 B1 | 5/2005 | Corston et al. | |
| 7,873,654 B2 | 1/2011 | Bernard | |
| 8,190,627 B2* | 5/2012 | Platt | G06F 16/242 |
| | | | 707/767 |
| 8,762,156 B2* | 6/2014 | Chen | G10L 15/26 |
| | | | 704/10 |
| 9,547,647 B2* | 1/2017 | Badaskar | G10L 15/26 |
| 9,548,050 B2* | 1/2017 | Gruber | G10L 15/26 |

(Continued)

OTHER PUBLICATIONS

Abe et al, Optimizing Directed Acyclic Graph Support Vector Machines, research gate, Jan. 2003, pp. 1-6.*

*Primary Examiner* — Lamont M Spooner
(74) *Attorney, Agent, or Firm* — Sheppard Mullin Richter & Hampton LLP

(57) ABSTRACT

Systems and methods are provided for natural language processing. An exemplary method implementable by a server may comprise: obtaining, from a computing device, an audio input and a current interface, wherein the current interface is associated with a context; and determining a query associated with the audio input based at least on the audio input and the context of the current interface.

20 Claims, 10 Drawing Sheets

(56) References Cited

U.S. PATENT DOCUMENTS

| | | | | |
|---|---|---|---|---|
| 9,576,574 B2* | 2/2017 | van Os | .................... | G10L 15/22 |
| 9,852,136 B2* | 12/2017 | Venkataraman | ........ | G06F 16/48 |
| 9,858,925 B2* | 1/2018 | Gruber | .................... | G10L 15/18 |
| 10,241,752 B2* | 3/2019 | Lemay | .................... | G06Q 30/02 |
| 10,276,170 B2* | 4/2019 | Gruber | .................... | G10L 17/22 |
| 2004/0148170 A1* | 7/2004 | Acero | .................... | G06F 40/216 |
| | | | | 704/257 |
| 2005/0049874 A1* | 3/2005 | Coffman | ................ | G06F 40/44 |
| | | | | 704/257 |
| 2013/0054228 A1* | 2/2013 | Baldwin | ................ | G06Q 30/02 |
| | | | | 704/9 |
| 2015/0066479 A1* | 3/2015 | Pasupalak | ............... | G06F 40/40 |
| | | | | 704/9 |
| 2015/0142447 A1* | 5/2015 | Kennewick | ........... | G10L 15/285 |
| | | | | 704/275 |
| 2018/0285595 A1* | 10/2018 | Jessen | ................. | G06F 21/6245 |
| 2019/0042988 A1* | 2/2019 | Brown | ................ | G06F 16/9535 |
| 2019/0068671 A1* | 2/2019 | Mehta | .................... | G06F 9/542 |
| 2019/0087455 A1* | 3/2019 | He | ....................... | G06F 16/3329 |
| 2019/0220246 A1* | 7/2019 | Orr | ......................... | G06F 3/167 |
| 2019/0220247 A1* | 7/2019 | Lemay | .................. | G06F 3/0481 |

\* cited by examiner

400

402: Obtaining, from a mobile device, an audio input and a current interface, wherein the current interface is associated with a context

404: Determining a query associated with the audio input based at least on the audio input and the context of the current interface

412: Feeding the audio input to an voice recognition engine to determine raw texts corresponding to the audio input

414: Feeding the raw texts and the context of the current interface to a natural language processing engine to determine the query associated with the audio input

482: Obtaining an audio input from a mobile device, wherein the audio is inputted to the mobile device when a first interface of the mobile device is active

484: Determining a context of the first interface, the first interface comprising an interface associated with media, an interface associated with navigation, or an interface associated with messaging

486: Feeding the audio input and the context of the first interface to one or more algorithms to determine an audio instruction associated with the audio input

488: Transmitting a mobile device instruction to the mobile device based on the determined audio instruction, causing the mobile device to execute the mobile device instruction

492: In response to determining that the audio instruction is empty, generating a first dialog based on the context of the first interface, causing the mobile device to play the first dialog

496: In response to determining that the audio instruction comprises a response, matching the response with a response database, and in response to detecting a matched response in the response database, causing the mobile device to execute the matched response

494: In response to determining that the audio instruction comprises an entity, extracting the entity, and generating a second dialog based on the extracted entity, causing the mobile device to play the second dialog

498: In response to determining that the audio instruction comprises a query, matching the query with a query database, and in response to detecting no matched query in the query database, feeding the audio input and the context of the first interface to the one or more of algorithms to determine an audio instruction associated with the query

FIGURE 4C

SYSTEM AND METHOD FOR NATURAL LANGUAGE PROCESSING

FIELD OF THE INVENTION

This disclosure generally relates to methods and devices for natural language processing in human-machine interaction.

BACKGROUND

Advances in human-machine interactions allow people to use their voices to effectuate control. For example, traditional instruction inputs via keyboard, mouse, or touch screen can be achieved with speeches. Nevertheless, many hurdles are yet to be overcome to streamline the process.

SUMMARY

Various embodiments of the present disclosure can include systems, methods, and non-transitory computer readable media configured to process natural language process. According to one aspect, a method for natural language processing, implementable by a server, may comprise: obtaining, from a computing device, an audio input and a current interface, wherein the current interface is associated with a context; and determining a query associated with the audio input based at least on the audio input and the context of the current interface.

In some embodiments, the computing device is configured to provide a plurality of inter-switchable interfaces, the plurality of interfaces comprise at least one of: an interface associated with navigation, an interface associated with media, or an interface associated with messaging, the context of the current interface comprises a first context and a second context, the first context comprises at least one of: the current interface as navigation, the current interface as media, or the current interface as messaging, and the second context comprises at least one of: an active route, a location, an active media session, or an active message.

In some embodiments, determining the query associated with the audio input based at least on the audio input and the context of the current interface comprises: feeding the audio input to an voice recognition engine to determine raw texts corresponding to the audio input, and feeding the raw texts and the context of the current interface to a natural language processing engine to determine the query associated with the audio input.

In some embodiments, feeding the raw texts and the context of the current interface to the natural language processing engine to determine the query associated with the audio input comprises: pre-processing the raw texts based on at least one of: lemmatizing, spell-checking, singularizing, or sentiment analysis to obtain pre-processed texts; matching the pre-processed texts against preset patterns; in response to not detecting any preset pattern matching the pre-processed texts, tokenizing the texts; and vectorizing the tokenized texts to obtain vectorized texts.

In some embodiments, feeding the raw texts and the context of the current interface to the natural language processing engine to determine the query associated with the audio input further comprises: dynamically updating one or more weights associated with one or more first machine learning models at least based on the first context; and applying the one or more first machine learning models to the first context and at least one of: the raw texts, the pre-processed text, the tokenized texts, or the vectorized texts, to obtain an intent classification of the audio input.

In some embodiments, applying the one or more first machine learning models to obtain the intent classification of the audio input comprises: applying a decision-tree-based model and a feedforward neural network model each to the first context and to the at least one of: the raw texts, the pre-processed text, the tokenized texts, or the vectorized texts to obtain corresponding output classifications; in response to determining that an output classification from the decision-tree-based model is the same as an output classification from the feedforward neural network model, using the either output classification as the intent classification of the audio input; and in response to determining that the output classification from the decision-tree-based model is different from the output classification from the feedforward neural network model, applying a directed acyclic graph-support vector machine (DAGSVM) model to the corresponding at least one of: the raw texts, the pre-processed text, the tokenized texts, or the vectorized texts to obtain the intent classification of the audio input.

In some embodiments, feeding the raw texts and the context of the current interface to the natural language processing engine to determine the query associated with the audio input further comprises: applying one or more second machine learning models to the second context and at least one of: the raw texts, the pre-processed text, the tokenized texts, or the vectorized texts to obtain a sub-classification prediction distribution of the audio input, the one or more second machine learning models comprising at least one of: a naive bayes model, a term frequency-inverse document frequency model, a N-gram model, a recurrent neural network model, or a feedforward neural network model; and comparing the sub-classification prediction distribution with a preset threshold and against an intent database to obtain a sub-classification of the audio input, wherein the sub-classification corresponds to a prediction distribution exceeding the preset threshold and matches an intent in the intent database.

In some embodiments, feeding the raw texts and the context of the current interface to the natural language processing engine to determine the query associated with the audio input further comprises: in response to multiple prediction distributions exceeding the preset threshold, determining that the audio input corresponds to multiple intents and applying a neural network model to divide the at least one of: the raw texts, the pre-processed text, the tokenized texts, or the vectorized texts correspondingly according to the multiple intents; and for each of the divided texts, applying the N-gram model to obtain the corresponding intent sub-classification.

In some embodiments, feeding the raw texts and the context of the current interface to the natural language processing engine to determine the query associated with the audio input further comprises: in response to determining that the intent classification and the intent sub-classification are consistent, extracting one or more entities from the tokenized texts; and in response to determining that the intent classification and the intent sub-classification are inconsistent, re-applying the one or more first machine learning models without the context of the current interface to the at least one of: the raw texts, the pre-processed text, the tokenized texts, or the vectorized texts to update the intent classification of the audio input.

In some embodiments, feeding the raw texts and the context of the current interface to the natural language processing engine to determine the query associated with the audio input further comprises: identifying one or more entities from the tokenized text based on at least one of the intent classification, the intent sub-classification, or the second context; determining contents associated with the one or more entities based on at least one of public data or personal data; and determining the query as an intent corresponding to at least one of the intent classification or the intent sub-classification, in association with the determined one or more entities and the determined contents.

According to another aspect, a system for natural language processing, implementable on a server, may comprise a processor and a non-transitory computer-readable storage medium storing instructions that, when executed by the processor, cause the system to perform a method. The method may comprise: obtaining, from a computing device, an audio input and a current interface, wherein the current interface is associated with a context; and determining a query associated with the audio input based at least on the audio input and the context of the current interface.

According to another aspect, a method for natural language processing may comprise: obtaining an audio input from a computing device, wherein the audio is inputted to the computing device when a first interface of the computing device is active, determining a context of the first interface, the first interface comprising an interface associated with media, an interface associated with navigation, or an interface associated with messaging, feeding the audio input and the context of the first interface to one or more algorithms to determine an audio instruction associated with the audio input, and transmitting a computing device instruction to the computing device based on the determined audio instruction, causing the computing device to execute the computing device instruction.

In some embodiments, transmitting the computing device instruction to the computing device based on the determined audio instruction, causing the computing device to execute the computing device instruction comprises: in response to determining that the audio instruction is empty, generating a first dialog based on the context of the first interface, causing the computing device to play the first dialog; in response to determining that the audio instruction comprises an entity, extracting the entity, and generating a second dialog based on the extracted entity, causing the computing device to play the second dialog; in response to determining that the audio instruction comprises a response, matching the response with a response database, and in response to detecting a matched response in the response database, causing the computing device to execute the matched response; and in response to determining that the audio instruction comprises a query, matching the query with a query database, and in response to detecting no matched query in the query database, feeding the audio input and the context of the first interface to the one or more of algorithms to determine an audio instruction associated with the query.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4A illustrates a flowchart of an example method for natural language processing, in accordance with various embodiments.

FIG. 4C illustrates a flowchart of an example method for natural language processing, in accordance with various embodiments.

DETAILED DESCRIPTION

Voice control can readily replace traditional control methods such as touch control or button control when they are impractical or inconvenient. For example, a vehicle driver complying with safety rules may be unable to divert much attention to his mobile phone, nor to operate on its touch screen. In such situations, voice control can help effectuate the control without any physical or visual contact with the device. Enabled by voice control, the device can also play specific contents according to an instruction spoken by the user.

Voice control applications require high accuracies. In the driver's example, erroneous interpretations of the voice input may cause frustration and terrible user experience, or even accidents. So far, it has been challenging to achieve accurate machine comprehension of human voice inputs.

The disclosed systems and methods can at least improve the accuracy of understanding human voice inputs, that is, the accuracy of processing natural language. Various embodiments of the present disclosure can include systems, methods, and non-transitory computer readable media configured to process natural language process. Example methods can leverage context information of graphic user interface (GUI) and user-machine interactions to supplement natural language processing and improve the performance of user intention interpretation. By considering the context of the current interface, the system can dynamically adjust the weights of classification classes associated with the user's intentions, thus better interpret user's audio input and reduce the needs for further clarification from the user. Further, the methods can help generate appropriate dialogs based on the context, prioritize the active sessions, and offer personalized recommendations.

According to one aspect, a method for natural language processing, implementable by a server, may comprise: obtaining, from a computing device, an audio input and a current interface, wherein the current interface is associated with a context; and determining a query associated with the audio input based at least on the audio input and the context of the current interface.

According to another aspect, a method for natural language processing may comprise: obtaining an audio input from a computing device, wherein the audio is inputted to the computing device when a first interface of the computing device is active, determining a context of the first interface, the first interface comprising an interface associated with media, an interface associated with navigation, or an interface associated with messaging, feeding the audio input and the context of the first interface to one or more algorithms to determine an audio instruction associated with the audio input, and transmitting a computing device instruction to the computing device based on the determined audio instruction, causing the computing device to execute the computing device instruction.

Figure 1:
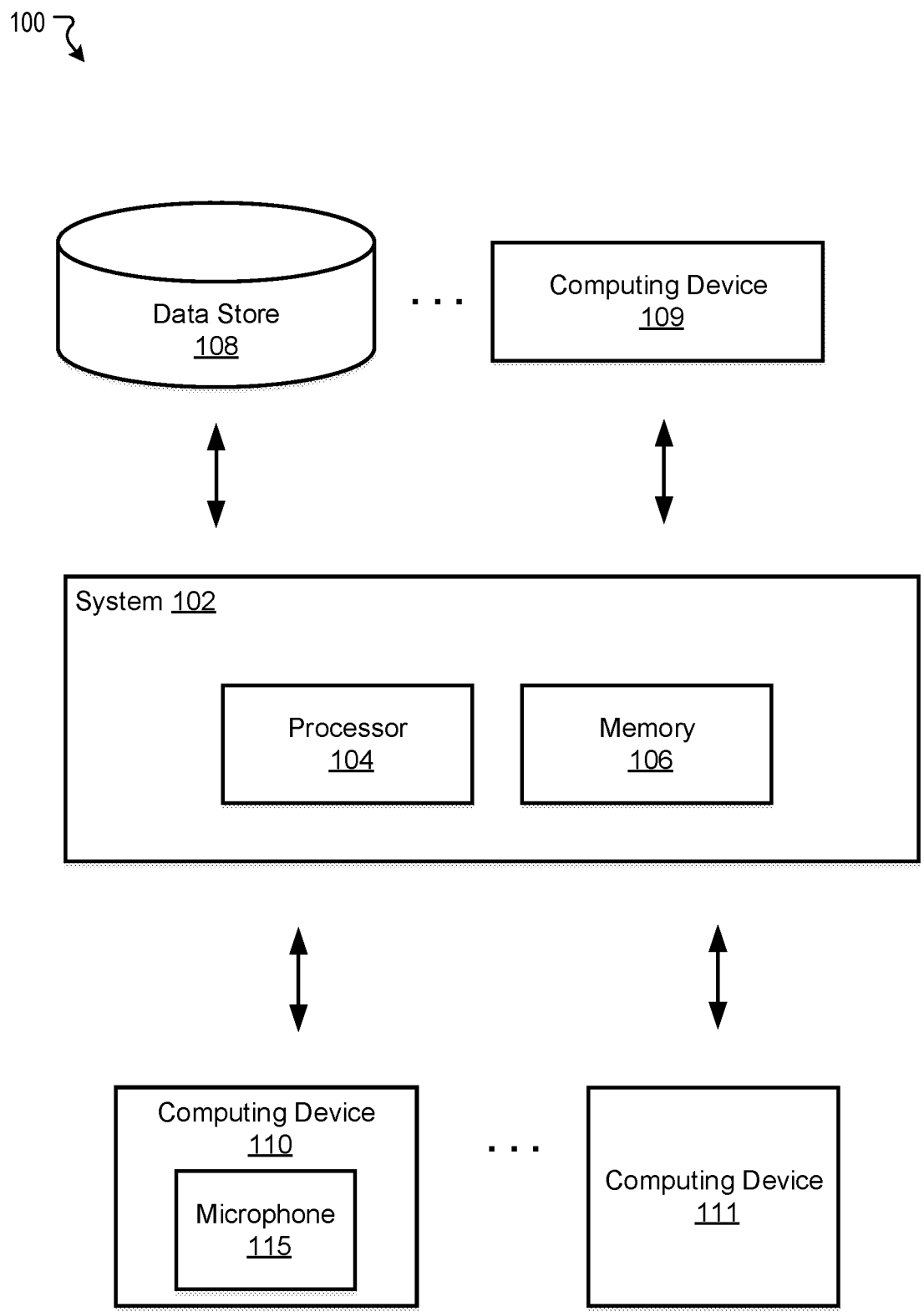
FIG. 1 illustrates an example environment for natural language processing, in accordance with various embodiments.

FIG. 1 illustrates an example environment 100 for processing natural language, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The instructions may comprise various algorithms, models, and databases described herein. Alternatively, the algorithms, models, and databases may be stored remotely (e.g., on a cloud server) and accessible to the system 102. The system 102 may be implemented on or as various devices such as mobile phone, tablet, server, computer, wearable device (smart watch), etc. The system 102 above may be installed with appropriate software (e.g., platform program, etc.) and/or hardware (e.g., wires, wireless connections, etc.) to access other devices of the environment 100.

The environment 100 may include one or more data stores (e.g., a data store 108) and one or more computing devices (e.g., a computing device 109) that are accessible to the system 102. In some embodiments, the system 102 may be configured to obtain data (e.g., music album, podcast, audio book, radio, map data, email server data) from the data store 108 (e.g., a third-party database) and/or the computing device 109 (e.g., a third-party computer, a third-party server). The map data may comprise GPS (Global Positioning System) coordinates of various locations.

The environment 100 may further include one or more computing devices (e.g., computing devices 110 and 111) coupled to the system 102. The computing devices 110 and 111 may comprise devices such as mobile phone, tablet, computer, wearable device (e.g., smart watch, smart headphone), home appliances (e.g., smart fridge, smart speaker, smart alarm, smart door, smart thermostat, smart personal assistant), robot (e.g., floor cleaning robot), etc. The computing devices 110 and 111 may each comprise a microphone or an alternative component configured to capture audio inputs. For example, the computing device 110 may comprise a microphone 115 configured to capture audio inputs. The computing devices 110 and 111 may transmit or receive data to or from the system 102.

In some embodiments, although the system 102 and the computing device 109 are shown as single components in this figure, it is appreciated that the system 102 and the computing device 109 can be implemented as single devices, multiple devices coupled together, or an integrated device. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. The system 102 may be implemented as a single system or multiple systems coupled to each other. In general, the system 102, the computing device 109, the data store 108, and the computing device 110 and 111 may be able to communicate with one another through one or more wired or wireless networks (e.g., the Internet, Bluetooth, radio) through which data can be communicated. Various aspects of the environment 100 are described below in reference to FIG. 2 to FIG. 5.

Figure 2:
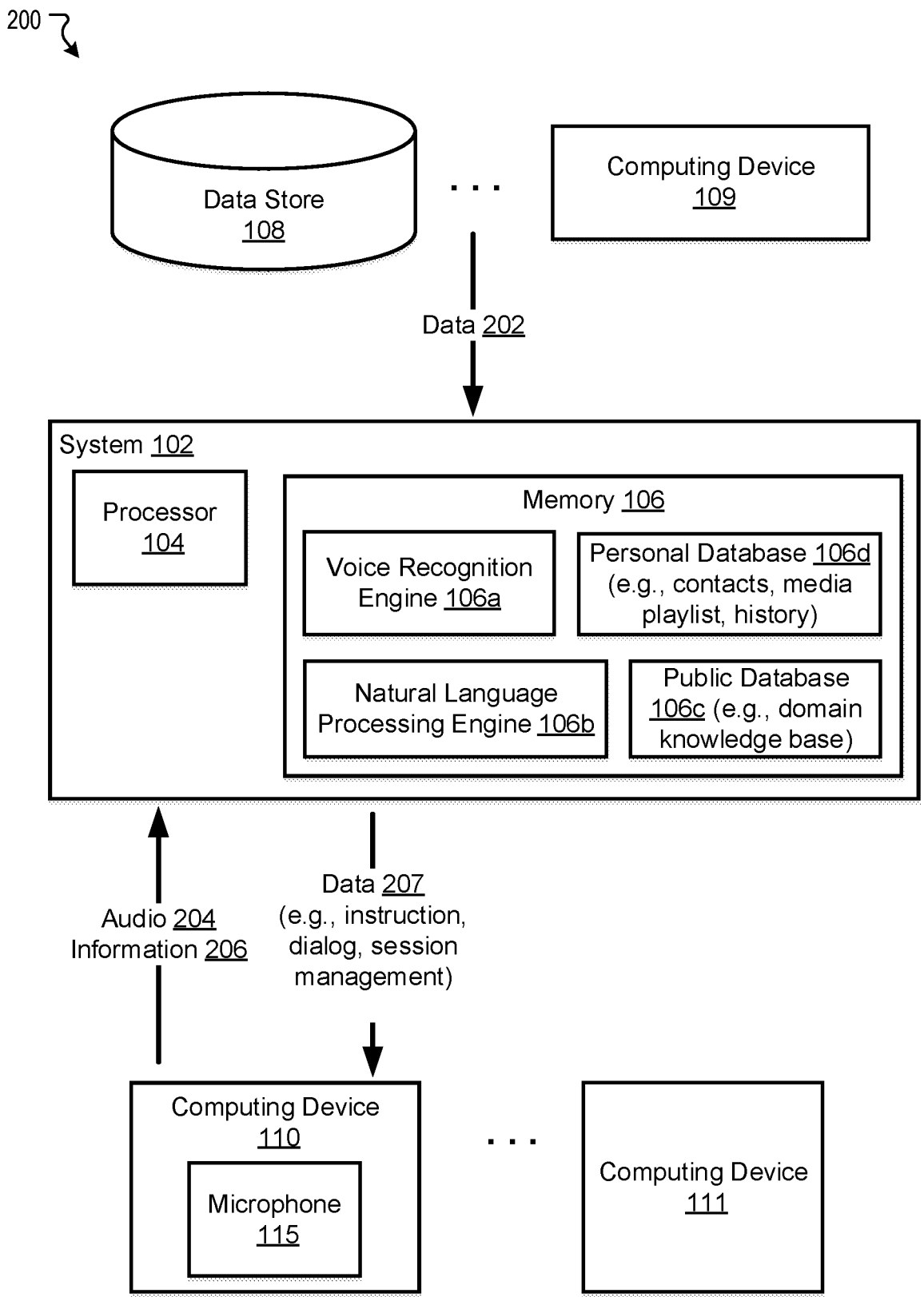
FIG. 2 illustrates an example system for natural language processing, in accordance with various embodiments.

FIG. 2 illustrates an example system 200 for processing natural language, in accordance with various embodiments. The operations shown in FIG. 2 and presented below are intended to be illustrative. In various embodiments, the system 102 may obtain an audio input from a computing device, wherein the audio is inputted to the computing device when a first interface of the computing device is active; determine a context of the first interface, the first interface comprising an interface associated with media, an interface associated with navigation, or an interface associated with messaging; feed the audio input and the context of the first interface to one or more algorithms to determine an audio instruction associated with the audio input; and transmit a computing device instruction to the computing device based on the determined audio instruction, causing the computing device to execute the computing device instruction. Each step is described in further details below.

In some embodiments, the system 102 may obtain data 202 from the data store 108 and/or the computing devices 109, and obtain audio 204 and information 206 from the computing devices 110. The data 202 may be obtained in advance to, contemporaneous with, or after the audio 204. The information 206 may be obtained in conjunction with or after the audio 204. The audio 204 may comprise an audio input, and the information 206 may comprise a current interface of the computing device 110. The data 202 may comprise public data (e.g., music albums, artists, audio books, radio, map data, locations of points-of-interest, operating hours of points-of-interest, etc.) and personal data (e.g., personal music albums, personal podcasts, personal audio books, personal radio, personal playlists (possibly created on a third-party software platform), personal media player references, personal map data, personal routes, personal locations, personal messages such as text messages or emails). The personal data may also include personal preferences (e.g., favorite music, saved locations, contacts) and histories (e.g., played music, past navigations, searched locations, message history). The public data may be stored in a public database 106c of the memory 106. The personal data may be stored in a personal database 106d of the memory 106. Although shown as separate databases, the public and personal databases may alternatively be integrated together.

In some embodiments, the system 102 may obtain, from a computing device (e.g., the computing device 110), an audio input (e.g., the audio 204) and a current interface (e.g., as a part of the information 206), wherein the current interface is associated with a context. For example, a user may speak within a detection range of the microphone 115, such that an audio input (e.g., "find me a coffee shop near ABC University," "play my most recent playlist") is captured by the computing device 110. The system 102 may obtain from the computer device 110 the audio input and the current interface.

Figure 3A:
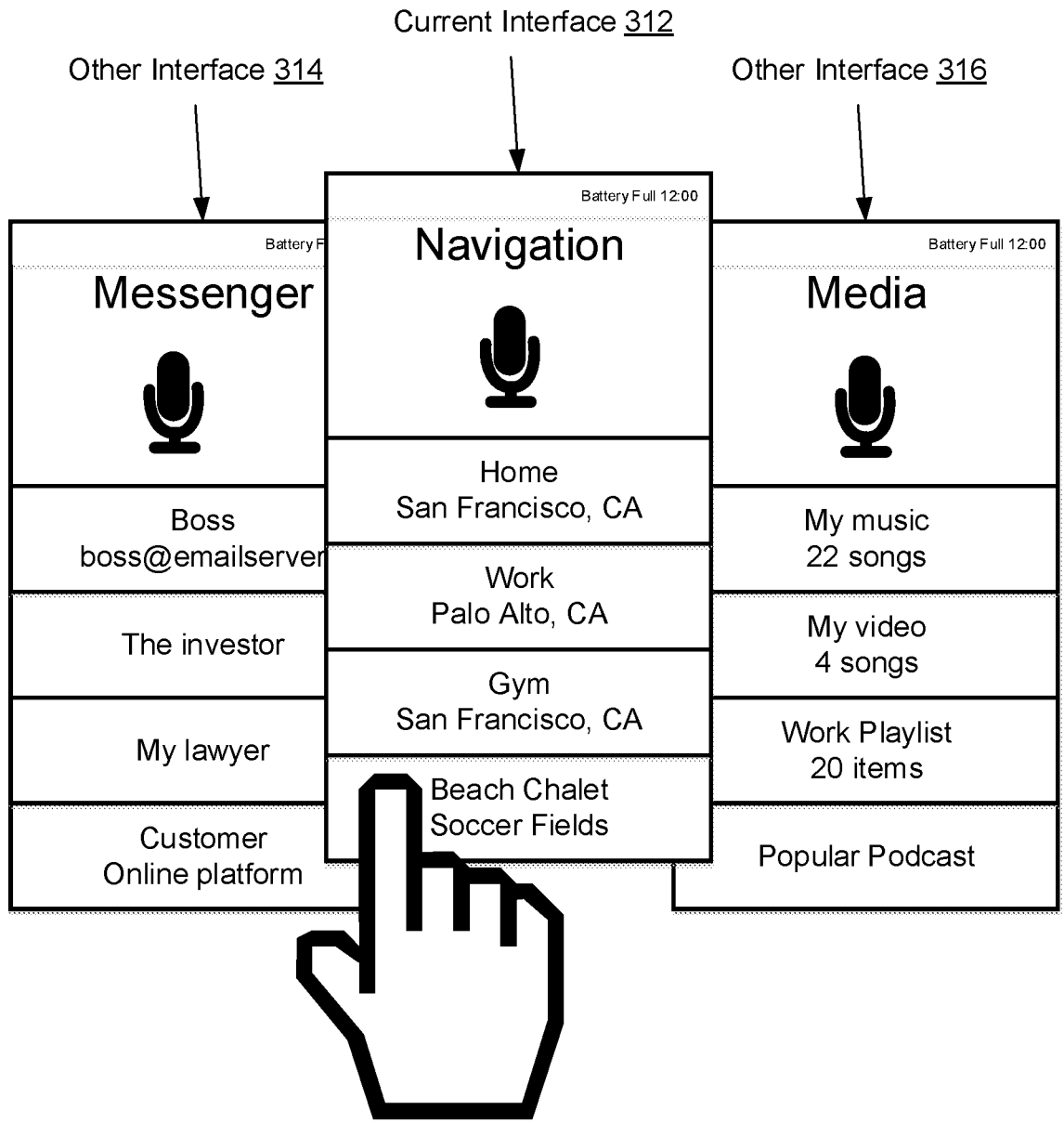
FIG. 3A illustrates example interfaces, in accordance with various embodiments.

Referring to FIG. 3A which illustrates example interfaces of the computing device 110. In some embodiments, the computing device is configured to provide a plurality of inter-switchable interfaces. The switching can be achieved, for example, by swiping on a touch screen or by voice control. The plurality of interfaces may comprise at least one of: an interface associated with navigation (e.g., a current interface 312), an interface associated with media (e.g., other interface 316), or an interface associated with messaging (e.g., other interface 314). The current interface may be a currently active or selected interface on the computing device. For example when the interface 312 is currently active, the interface 314 and 316 are inactive. The audio input may be (but not necessarily) captured at the current interface. If the interface has switched several times as the user speaks to the microphone, the current interface obtained by the system 102 may be preset to a certain (e.g., the last) interface during the span of the audio input. In one example, a user may have triggered a "microphone trigger" associated with the current interface 312 to capture the audio input. In another example, the user may have triggered a generic button on the computing device to capture the audio input. In another example, the microphone may continuously capture audio, and upon detecting a keyword, the computing device may obtain the audio input following the keyword. In yet another example, the microphone may start capturing the audio after any interface becomes current.

Still referring to FIG. 3A, in some embodiments, the context of the current interface may comprise a first context and a second context. The first context may comprise at least one of: the current interface as navigation, the current interface as media, or the current interface as messaging. That is, the first context may provide an indication of the main category or theme of the current interface. The second context may comprise at least one of: an active route, a location (e.g., a current location of the computing device), an active media session, or an active message. The active route may comprise a selected route for navigation. The location may comprise a current location of the computing device, any location on a map, etc. The active media session may comprise a current media (such as music, podcast, radio, audio book) on the media interface. The active message may comprise any message on the messaging interface. The context of the current interface may comprise many other types of information. For example, if the current interface 312 is navigation, the context of the current interface may comprise an indication that the current interface is navigation, an active route, a location, etc. The current interface 312 in FIG. 3A shows four current locations (home, work, gym, and beach chalet), which may be included in the second context.

Referring back to FIG. 2, the system 102 may determine an audio instruction associated with the audio input based at least on the audio input and the context of the current interface. The audio instruction may refer to the instruction carried in the audio input, which may comprise one or more of: an entity, a response, a query, etc. The system 102 may further transmit a computing device instruction to the computing device based on the determined audio instruction, causing the computing device to execute the computing device instruction. The data 207 may comprise the computing device instruction, which can be a command (e.g., playing a certain music), a dialog (e.g., a question played to solicit further instructions from the user), a session management (e.g., sending an message to a contact, starting a navigation to home), etc. The effect of the data 207 can also be referred to below where the system 102 causes the (user's) computing device 110 to perform various functions.

In some embodiments, transmitting the computing device instruction to the computing device based on the determined audio instruction, causing the computing device to execute the computing device instruction, may comprise the following cases depending on the audio instruction. (1) In response to determining that the audio instruction is empty, the system 102 may generate a first dialog based on the context of the first interface, causing the computing device to play the first dialog. If the user supplies additional information in response to the dialog, the system 102 may analyze the additional information as an audio input. (2) In response to determining that the audio instruction comprises an entity, the system 102 may extract the entity, and generate a second dialog based on the extracted entity, causing the computing device to play the second dialog (e.g., output 303*a* described below). (3) In response to determining that the audio instruction comprises a response, the system 102 may match the response with a response database, and in response to detecting a matched response in the response database, cause the computing device to execute the matched response (e.g., output 303*b* described below). (4) In response to determining that the audio instruction comprises a query, the system 102 may match the query with a query database. In response to detecting a matched query in the query database, the matched query may be outputted (e.g., output 303*c* described below). In response to detecting no matched query in the query database, feed the audio input and the context of the first interface to the one or more of algorithms to determine an audio instruction associated with the query (e.g., output 303*d* described below). Further details of these cases and the associated algorithms (e.g., a voice recognition engine 106*a* and a natural language processing engine 106*b* in the memory 106) are described below with reference to FIGS. 3B-3D.

Figure 3B:
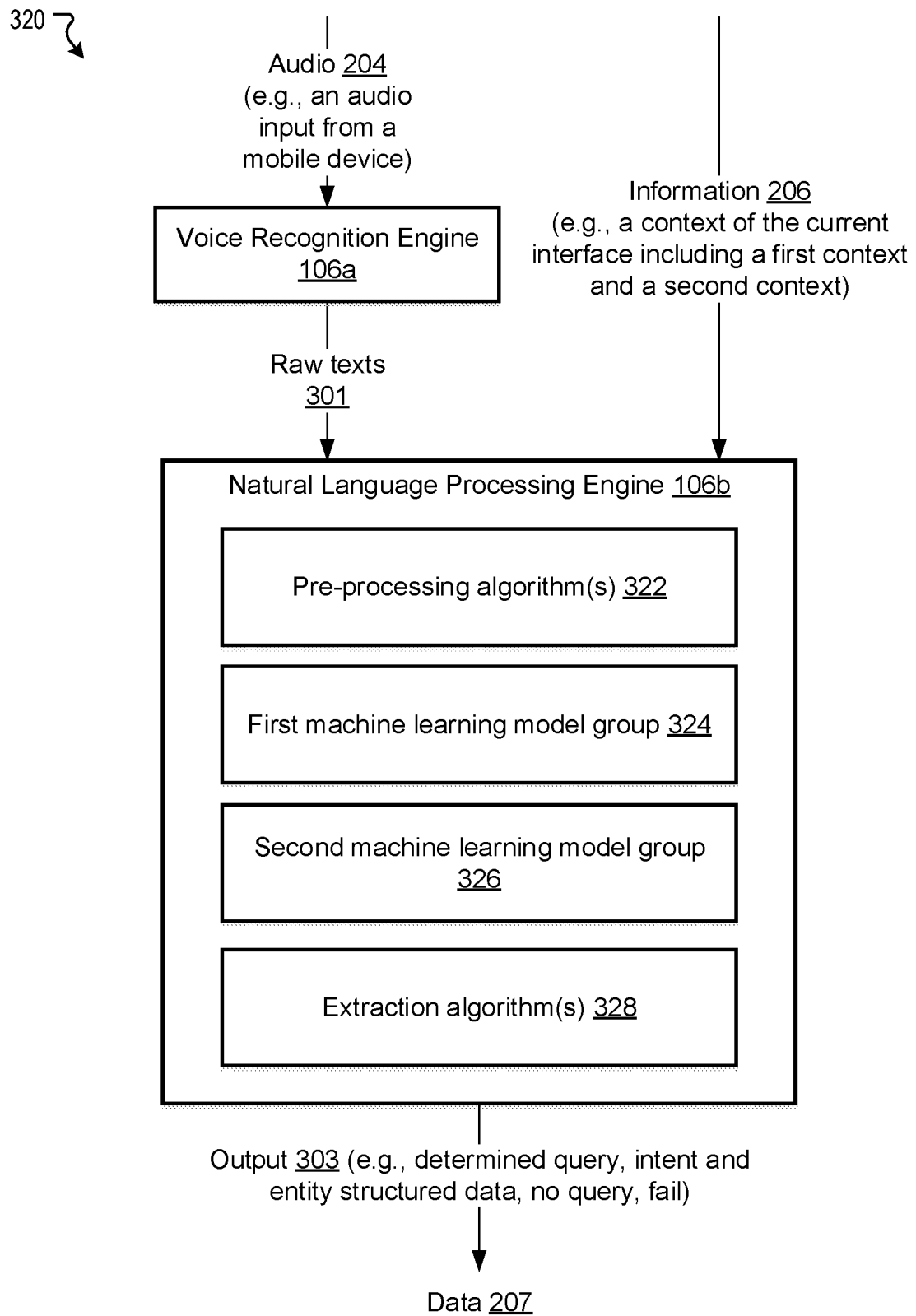
FIGS. 3B-3D illustrates example algorithms for natural language processing, in accordance with various embodiments.

FIG. 3B illustrates example algorithms for natural language processing, in accordance with various embodiments. The algorithms may be shown in association with an example flowchart 320. The operations shown in FIG. 3B and presented below are intended to be illustrative. Depending on the implementation, the example flowchart 320 may include additional, fewer, or alternative steps performed in various orders or in parallel. Various steps described below which call for "matching" may be performed by algorithms such as rule-based pattern matching.

In some embodiments, the system 102 may feed the audio input (e.g., the audio 204) to an voice recognition engine 106*a* to determine raw texts 301 corresponding to the audio input. There can be many example algorithms to implement the voice recognition engine 106*a*, for converting the audio input to corresponding texts. For example, the voice recognition engine 106*a* may first apply an acoustic model (e.g., Viterbi Model, Hidden Markov Model). The acoustic model may have been trained to represent the relationship between the audio recording of the speech and phonemes or other linguistic units that make up the speech, thus relating the audio recording to word or phrase candidates. The training may feed the acoustic model with sample pronunciations with labelled phonemes, so that the acoustic model can identify phonemes from audios. The voice recognition engine 106*a* may dynamically determine the start and end for each phoneme in the audio recording and extract features (e.g., character vectors) to generate speech fingerprints. The voice recognition engine 106a may compare the generated speech fingerprints with a phrase fingerprint database to select the most matching word or phrase candidates. The phrase fingerprint database may comprise the mapping between the written representations and the pronunciations of words or phrases. Thus, one or more sequence candidates comprising various combinations of words or phrases may be obtained. Further, the voice recognition engine 106a may apply a language model (e.g., a N-gram model) to the one or more sequence candidates. The language model represents a probability distribution over a sequence of phrase, each determined from the acoustic model. The voice recognition engine 106a may compare the selected words or phrases in the candidate sequences with a sentence fingerprint database (e.g., a grammar and semantics model) to select the most matching sentence as the raw texts 301. The above example acoustic model and language model and other alternative models and their training are incorporated herein by reference.

In some embodiments, the system 102 may further feed the raw texts 301 and the context of the current interface (e.g., a part of the information 206) to a natural language processing engine 106b to determine an audio instruction (e.g., an entity, a response, a query) associated with the audio input. The natural language processing engine 106b may comprise: pre-processing algorithm(s) 322, first machine learning model group 324, second machine learning model group 326, and extraction algorithm(s) 328, the details of which are described below with reference to FIGS. 3C-3D. Also shown in FIGS. 3C-3D, the natural language processing engine 106b may comprise various other algorithms to help implement the disclosed methods. The natural language processing engine 106b may produce output 303 (e.g., determined query, intent, entity structure data, empty message, failure message, outputs 303a-303f described below). Accordingly, the system 102 may utilize various algorithms described above with reference to FIG. 2 to obtain the data 207.

Figure 3C:
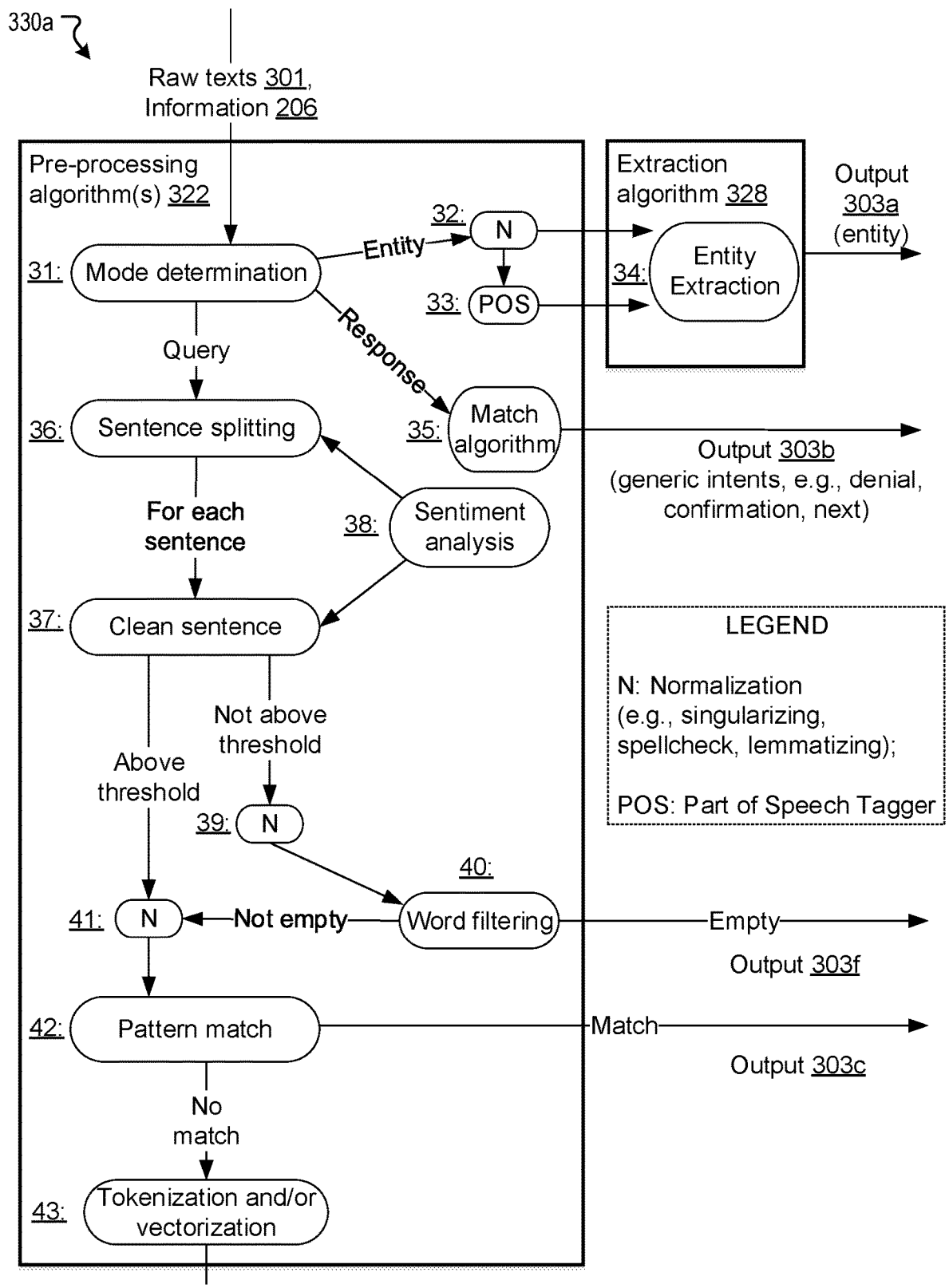
Figure 3D:
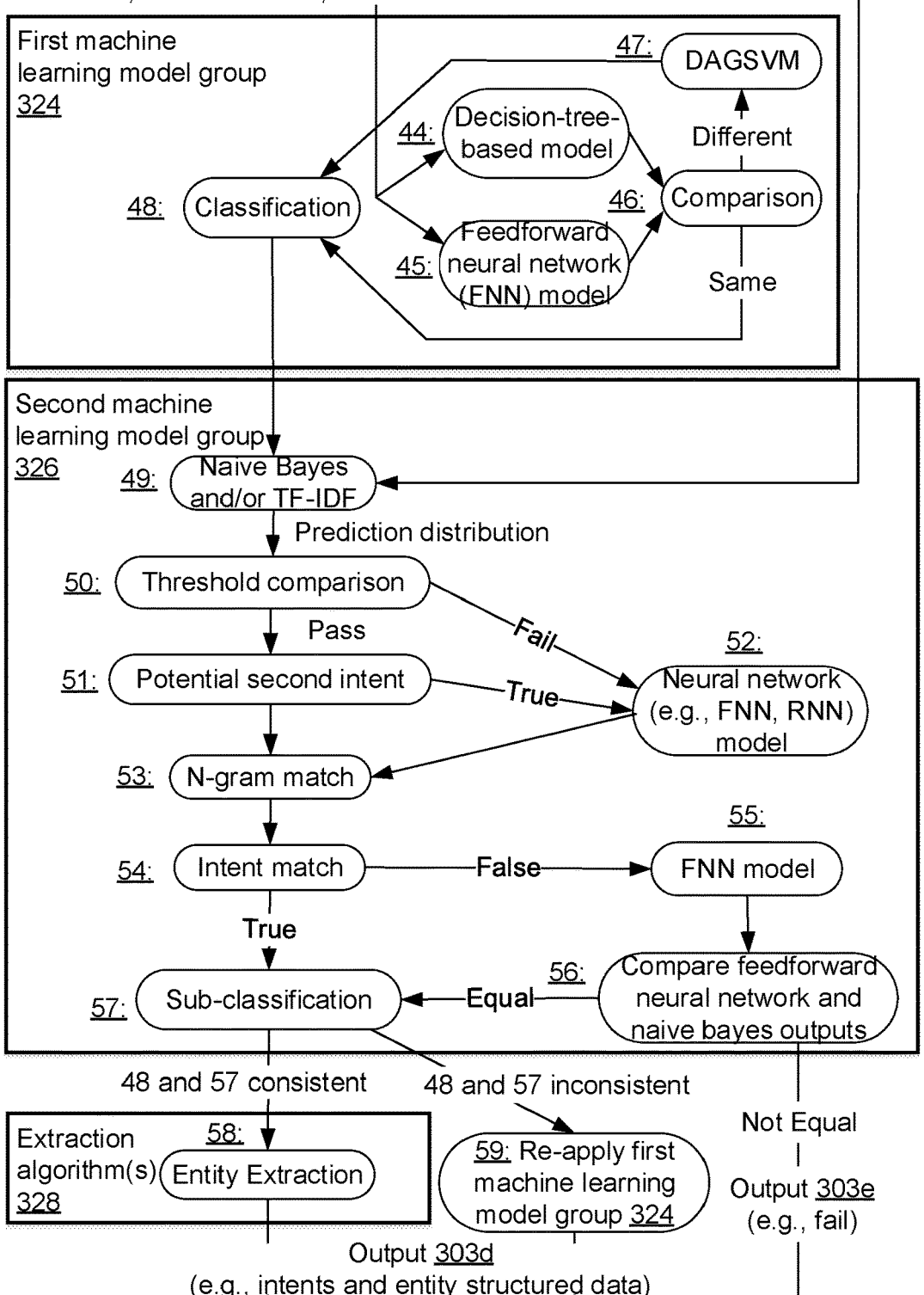

FIGS. 3C and 3D illustrate example algorithms for natural language processing, in accordance with various embodiments. The algorithms may be shown in association with an example flowchart 330 (separated into algorithms 330a and 330b in respective figures). The operations shown in FIGS. 3C and 3D and presented below are intended to be illustrative. Depending on the implementation, the example flowchart 330 may include additional, fewer, or alternative steps performed in various orders or in parallel.

As shown in FIG. 3C, pre-processing algorithm(s) 332 may be configured to pre-process the raw texts 301, in light of information 206 at one or more steps. In some embodiments, feeding the raw texts and the context of the current interface to the natural language processing engine 106b to determine the query associated with the audio input comprises: pre-processing the raw texts based on at least one of: lemmatizing, spell-checking, singularizing, or sentiment analysis to obtain pre-processed texts; matching the pre-processed texts against preset patterns; in response to not detecting any preset pattern matching the pre-processed texts, tokenizing the texts; and vectorizing the tokenized texts to obtain vectorized texts. Various pre-processing algorithms and associated steps are described below.

At block 31, a mode determination algorithm may be applied to determine if the raw texts comprise only an "entity" (e.g., an entity name), only a "response" (e.g., a simple instruction), or a "query" (e.g., one or more queries), where the query may comprise an entity and/or a response.

In some embodiments, if the determination is "entity," the flowchart may proceed to block 32 where a normalization algorithm can be applied to, for example, singularize, spell-check, and/or lemmatize (e.g., remove derivational affixes of words to obtain stem words) the raw texts. From block 32, the flowchart may proceed to block 34 or proceed to block 33 before proceeding to block 34. At block 33, a part of speech tagger algorithm may be used to tag the part-of-speech of the each word. At block 34, extraction algorithm 328 may be used to extract the entity as output 303a. In one example, the system 102 may have obtained the current interface as being "media" and the user's intention to play music, and have asked the user in a dialog "which music should be played?" The user may reply "Beethoven's" in an audio input. Upon the normalization and part-of-speech tagging, the system 102 may normalize "Beethoven's" to "Beethoven" as a noun and output "Beethoven." Accordingly, the system 102 can cause the user's computing device to obtain and play a Beethoven playlist. In another example, the system 102 may have obtain the current interface as being messaging and the user's intention to send an email, and have asked the user in a dialog "who should this email be sent to?" The user may reply "John Doe" in an audio input. The system 102 may recognize John Doe from the user's contacts. Accordingly, the system 102 may obtain John Doe's email address, and cause the user's computing device to start drafting the email.

In some embodiments, if the determination is "response," the flowchart may proceed to block 35 where a match algorithm may be applied to match the raw texts again a database of generic intents (e.g., confirmation, denial, next). If the match is successful, the matched generic intent can be obtained as output 303b. In one example, when a current interface is "media," the user may say "stop" to cease the music or "next" to play the next item in the playlist. In another example, in a dialog, the system 102 may ask some simple "yes" or "no" question. The user's answer, as a confirmation or denial, can be parsed accordingly. In yet another example, if the current interface is navigation from which the user tries to look for a gas station and the system 102 has determined three closest gas stations, the system 102 may play information of these three gas stations (e.g., addresses and distances from the current location). After hearing about the first gas station, the user may say "next," which can be parsed as described above, such that the system 102 will recognize and play the information of the next gas station.

In some embodiments, if the determination is "query," the flowchart may proceed to block 36 where a sentence splitting algorithm may be applied to split the raw texts into sentences. At block 37, for each sentence, a clean sentence algorithm may be applied to determine the politeness and/or remove noises. To both block 36 and block 37, a sentiment analysis algorithm at block 38 may be applied. The sentiment analysis algorithm may classify the sentence as positive, neutral, or negative. At block 37, if the determined politeness is above a preset threshold, the flowchart may proceed to block 41 where the normalization algorithm is applied. If the determined politeness is not above the preset threshold, the flowchart may proceed to block 39 where the normalization algorithm is applied, and then to block 40 where a filtering algorithm is applied to filter impolite words. After filtering, if the texts are empty, the audio input may be interpreted as a complaint. The system 102 may obtain a "user complaint" as output 303f and cause the user's computing device to create a dialog to help resolve the complaint. If the texts are non-empty, the flowchart may proceed to block 41. The raw texts 301 pre-processed by any one or more steps from block 31 to block 41 may be referred to as pre-processed texts. From block 41, the flowchart may proceed to block 42, where a pattern match algorithm may be applied to match the pre-processed texts against an intent database, and a direct match may be obtained as output 303c. The intent database may store various preset intents. In one example, one of the preset intent "playing music" corresponds to detecting a text string of "play+[noun.]" when the current interface is "media." Accordingly, if the pre-processed texts are determined to be "can you please play Beethoven," the output 303c may be "play Beethoven." If there is no direct match, the flowchart may proceed to block 43, where a tokenization algorithm may be applied to obtain tokenized texts (e.g., an array of tokens each representing a word). The tokenized texts may be further vectorized by a vectorization algorithm to obtain vectorized texts (e.g., each word represented by strings of "0" and "1").

Continuing from FIG. 3C to FIG. 3D, first machine learning model group 324 and/or second machine learning model group 326 may be configured to process the raw texts 301, the pre-processed texts, the tokenized texts, and/or vectorized texts, in light of the information 206. That is, any of the texts in the various forms may be used as inputs to the first and then to the second machine learning model group, or directly to the second machine learning model group.

In some embodiments, the first machine learning model group 324 may be applied to obtain a general classification of the intent corresponding to the audio input at block 48. Feeding the raw texts and the context of the current interface to the natural language processing engine 106b to determine the query associated with the audio input further comprises: dynamically updating one or more weights associated with one or more first machine learning models at least based on the first context described above (comprised in the information 206); and applying the one or more first machine learning models to the first context and at least one of: the raw texts, the pre-processed text, the tokenized texts, or the vectorized texts, to obtain an intent classification of the audio input. The first machine learning models may comprise a decision-tree-based model, a feedforward neural network model, and a graph-support vector machine (DAGSVM) model, all of which and their training are incorporated herein by reference. Applying the one or more first machine learning models to obtain the intent classification of the audio input comprises: applying a decision-tree-based model (block 44) and a feedforward neural network model (block 45) each to the first context and to the at least one of: the raw texts, the pre-processed text, the tokenized texts, or the vectorized texts to obtain corresponding output classifications. The outputs of block 44 and block 45 are compared at block 46. In response to determining that an output classification from the decision-tree-based model is the same as an output classification from the feedforward neural network model, either of the output classification (from block 44 or block 45) can be used as the intent classification of the audio input (block 48). In response to determining that the output classification from the decision-tree-based model is different from the output classification from the feedforward neural network model, the DAGSVM model can be applied to the corresponding at least one of: the raw texts, the pre-processed text, the tokenized texts, or the vectorized texts (block 47) to obtain the intent classification of the audio input (block 48). In the above steps, based on the context of the current interface, one or more weights of the class associated with the user's intention in the each machine learning model can be dynamically adjusted. For example, for a current interface being "media," the "media" classification's weights may be increase in the various algorithms and models, thus improving the accuracy of the classification.

In some embodiments, the second machine learning model group 326 may be applied to obtain a sub-classification of the intent corresponding to the audio input at block 57. Feeding the raw texts and the context of the current interface to the natural language processing engine 106b to determine the query associated with the audio input further comprises: applying one or more second machine learning models 326 to the second context described above (comprised in the information 206) and at least one of: the raw texts, the pre-processed text, the tokenized texts, or the vectorized texts to obtain a sub-classification prediction distribution of the audio input; and comparing the sub-classification prediction distribution with a preset threshold and against an intent database to obtain a sub-classification of the audio input, wherein the sub-classification corresponds to a prediction distribution exceeding the preset threshold and matches an intent in the intent database. In response to multiple prediction distributions exceeding the preset threshold, the audio input may be determined to correspond to multiple intents, and a neural network model may be applied to divide the at least one of: the raw texts, the pre-processed text, the tokenized texts, or the vectorized texts correspondingly according to the multiple intents. For each of the divided texts, the N-gram model to may be applied to obtain the corresponding intent sub-classification.

In some embodiments, at block 49, the raw texts, the pre-processed text, the tokenized texts, the vectorized texts, the information 206, and/or the classification from block 48 may be fed to a naive bayes model and/or a term frequency-inverse document frequency (TF-IDF) model to obtain a sub-classification prediction distribution (e.g., a probability distribution for each type of possible sub-classification). Alternatively or additionally, the raw texts, the pre-processed text, the tokenized texts, the vectorized texts, and/or the information 206 may bypass the first machine learning model group and be fed to the second machine learning model group. At block 50, the prediction distribution may be applied with thresholding. If one or more prediction distribution exceeds the threshold, the flowchart may proceed to block 51; if no prediction distribution exceeds the threshold, the flowchart may proceed to block 52. At block 51, if two or more sub-classification predictions exceed the threshold (e.g., when the audio input is "navigate home and play music" which corresponds to two intents), the flowchart may proceed to block 52, where a neural network (e.g., feedforward neural network (FNN), recurrent neural network (RNN)) model may be applied to (1: following from block 51) separate the corresponding input texts into various text strings based on the multiple sub-classification predictions and/or (2: following from block 50) extract a sub-classification prediction. If just one sub-classification prediction exceeds the threshold, after the multiple sub-classification predictions are separated, or after the sub-classification prediction is extracted, the flowchart may proceed to block 53 where a N-gram model may be applied to convert the each text string (which corresponds to the sub-classification prediction) for approximate matching. By converting the sequence of text strings to a set of N-grams, the sequence can be embedded in a vector space, thus allowing the sequence to be compared to other sequences (e.g., preset intentions) in an efficient manner. Accordingly, at block 54, the converted set of N-grams (corresponding to the sub-classification prediction) may be compared against an intent database to obtain a matching intent in the intent database. The matching intent(s) may be obtained as the sub-classification(s) of the audio input at block 57.

In some embodiments, each sub-classification may represent a sub-classified intent, and the general classification described above at block 48 may represent a general intent. Each general classification may correspond to multiple sub-classification. For example, a general classification "media" may be associated with sub-classifications such as "play music," "play podcast," "play radio," "play audio book," "play video," etc. For another example, a general classification "navigation may be associated with sub-classifications such as "points-of-interest," "points-of-interest location search," "start navigation," "traffic," "show route," etc. For yet another example, a "messaging" classification may be associated with sub-classifications such as "email," "send text message," "draft social media message," "draft social media post," "read message," etc.

If the intent match is unsuccessful at block 54, a feedforward neural network model may be applied at block 55. At block 56, the outputs of the block 49 and the block 55 may be compared. If the two outputs are the same, the flowchart may proceed to block 57; otherwise, the second machine learning model group 326 may render output 303e (e.g., a fail message). The naive bayes model, the TF-IDF model, the N-gram model, the FNN, and the RNN, and their training are incorporated herein by reference. Based on the context of the current interface, one or more weights of the class associated with the user's intention in the each machine learning model can be dynamically adjusted, thus improving the accuracy of the classification.

In some embodiments, the classification from block 48 and the sub-classification from the block 57 may be compared. In response to determining that the intent classification (block 48) and the intent sub-classification (block 57) are consistent, extraction algorithm(s) 328 (e.g., conditional random field (CRF) incorporated herein by reference, name entity recognition (NER) algorithm incorporated herein by reference) may be applied to identify and extract one or more entities from the tokenized texts at block 58. Each sub-classification may be associated with one or more preset entities. The entities may be extracted from the public database 106c, the personal database 106d, or other databases or online resources based on matching. In response to determining that the intent classification and the intent sub-classification are inconsistent, the one or more first machine learning models 324, without the context of the current interface, may be re-applied at block 59 to the at least one of: the raw texts, the pre-processed text, the tokenized texts, or the vectorized texts to update the intent classification of the audio input. The inconsistency may arise when, for example, the user inputs a navigation-related audio when the current interface is not navigation (e.g., the user asks "how is the traffic to home" from the media interface). According to the flow of the first and second machine learning models, a general classification of "media" and a sub-classification of "traffic to home" may be obtained respectively and inconsistent with each other. Thus, the first machine learning models can be re-applied without the context information for adjusting the general classification.

In some embodiments, one or more entities from the tokenized text may be identified based on at least one of the intent classification, the intent sub-classification, or the second context; contents associated with the one or more entities may be determined based on at least one of public data or personal data; and the query may be determined as an intent corresponding to at least one of the intent classification or the intent sub-classification, in association with the determined one or more entities and the determined contents. From block 58 and block 59 respectively, an output 303d (e.g., a classified intent with associated entity structured data) may be obtained. For example, if the audio input is "find me a coffee shop near ABC University" at a navigation interface, the disclosed systems and methods can obtain a general classification of "navigation," a sub-classification of "points-of-interest location search," and a search target (entity 1 of the sub-classification) of "coffee shop," a search area (entity 2 of the sub-classification) of "ABC University." With the above information, the system 102 can generate an appropriate response and cause the user's computing device to respond accordingly to the user.

As shown above, the disclosed systems and methods including the multi-layer statistical based models can leverage interface context to supplement natural language processing and significantly improve the accuracy of machine-based audio interpretation. The supported contents and services (e.g., maps, traffic, music stream, radio, email, messenger) can be grouped into main categories such as "navigation," "media," and "messaging" and consolidated into a software application (e.g., a mobile phone application similar to FIG. 3A). The software application can implement the disclosed methods. Application users can be empowered to navigate, access, and manage their favorite contents and services easily and quickly while traditional control methods are unavailable, dangerous, or inconvenient. Four main benefits, among others, are elaborated below.

The disclosed systems and methods can offer highly accurate intent prediction, by taking user's current context information such as the current interface into consideration. The natural language processing engine can dynamically adjust the weights towards each general classification candidate and sub-classification candidate, which means the current interface-related intents can have a higher numerical representation in the prediction distribution and more likely to be matched.

The disclosed systems and methods can also offer dialog conversation with the user. Understanding the current interface context can help the system generate appropriate dialogs to instantly engage the user and respond specifically. For example, if the user triggers the microphone at yjr "media" interface but does not give clear commands, the system can generate an instant voice dialog "do you want to play your most recent playlist" (as a voice) to quickly engage user's intention. The voice dialog's content can be generated based on the current interface context.

The disclosed systems and methods can also offer effective session management. For example, users may give generic commands like "stop", "start," and "next", which can be used with different intents and at different interfaces. The above systems and methods can reduce the ambiguity in the interpretation and avoid excessive probing, by encompassing various scenarios in the above algorithms.

The disclosed systems and methods can further offer personalized recommendations. Giving recommendations is useful especially in a driving scenario where driver's hands are occupied and attention is focused on the road. The above systems and methods can provide personal recommendations for driving routes, media contents, schedule management, and instant contacts based on a current session, the user's settings, the user's preferences, and/or the user's histories such as past schedules and past routes.

FIG. 4A illustrates a flowchart of an example method 400, according to various embodiments of the present disclosure. The method 400 may be implemented in various environments including, for example, the environment 100 of FIG. 1. The example method 400 may be implemented by one or more components of the system 102 (e.g., the processor 104, the memory 106). The example method 400 may be implemented by multiple systems similar to the system 102. The operations of method 400 presented below are intended to be illustrative. Depending on the implementation, the example method 400 may include additional, fewer, or alternative steps performed in various orders or in parallel.

At block 402, an audio input and a current interface may be obtained from a computing device, wherein the current interface is associated with a context. At block 404, a query associated with the audio input may be determined based at least on the audio input and the context of the current interface. In some embodiments, the computing device is configured to provide a plurality of inter-switchable interfaces, the plurality of interfaces comprise at least one of: an interface associated with navigation, an interface associated with media, or an interface associated with messaging, the context of the current interface comprises a first context and a second context, the first context comprises at least one of: the current interface as navigation, the current interface as media, or the current interface as messaging, and the second context comprises at least one of: an active route, a location, an active media session, or an active message.

The block 404 may comprise block 412 and block 414. At block 412, the audio input may be fed to an voice recognition engine to determine raw texts corresponding to the audio input. At block 414, the raw texts and the context of the current interface may be fed to a natural language processing engine to determine the query associated with the audio input. The block 414 may comprise the method 420 described below.

Figure 4B:
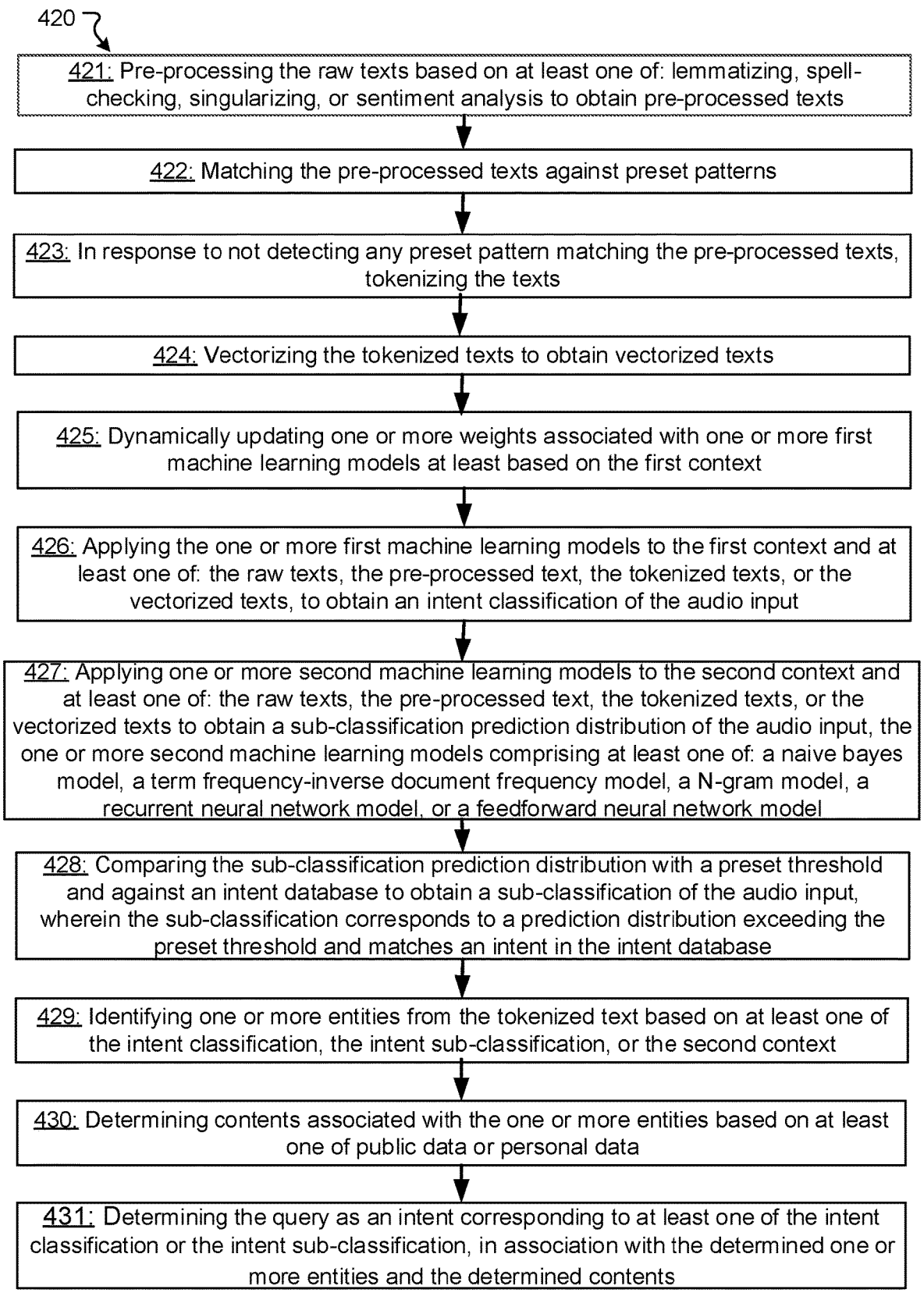
FIG. 4B illustrates a flowchart of an example method for natural language processing, in accordance with various embodiments.

FIG. 4B illustrates a flowchart of an example method 420, according to various embodiments of the present disclosure. The method 420 may be implemented in various environments including, for example, the environment 100 of FIG. 1. The example method 420 may be implemented by one or more components of the system 102 (e.g., the processor 104, the memory 106). The example method 420 may be implemented by multiple systems similar to the system 102. The operations of method 420 presented below are intended to be illustrative. Depending on the implementation, the example method 420 may include additional, fewer, or alternative steps performed in various orders or in parallel. Various modules described below may have been trained, e.g., by the methods discussed above.

At block 421, the raw texts may be pre-processed based on at least one of: lemmatizing, spell-checking, singularizing, or sentiment analysis to obtain pre-processed texts. At block 422, the pre-processed texts may be matched against preset patterns. At block 423, in response to not detecting any preset pattern matching the pre-processed texts, the texts may be tokenized. At block 424, the tokenized texts may be vectorized to obtain vectorized texts.

At block 425, one or more weights associated with one or more first machine learning models may be dynamically updated at least based on the first context. At block 426, the one or more first machine learning models may be applied to the first context and at least one of: the raw texts, the pre-processed text, the tokenized texts, or the vectorized texts, to obtain an intent classification of the audio input. In some embodiments, the block 426 comprises: applying a decision-tree-based model and a feedforward neural network model each to the first context and to the at least one of: the raw texts, the pre-processed text, the tokenized texts, or the vectorized texts to obtain corresponding output classifications; in response to determining that an output classification from the decision-tree-based model is the same as an output classification from the feedforward neural network model, using the either output classification as the intent classification of the audio input; and in response to determining that the output classification from the decision-tree-based model is different from the output classification from the feedforward neural network model, applying a directed acyclic graph-support vector machine (DAGSVM) model to the corresponding at least one of: the raw texts, the pre-processed text, the tokenized texts, or the vectorized texts to obtain the intent classification of the audio input.

At block 427, one or more second machine learning models may be applied to the second context and at least one of: the raw texts, the pre-processed text, the tokenized texts, or the vectorized texts to obtain a sub-classification prediction distribution of the audio input, the one or more second machine learning models comprising at least one of: a naive bayes model, a term frequency-inverse document frequency model, a N-gram model, a recurrent neural network model, or a feedforward neural network model. At block 428, the sub-classification prediction distribution may be compared with a preset threshold and matched against an intent database to obtain a sub-classification of the audio input, wherein the sub-classification corresponds to a prediction distribution exceeding the preset threshold and matches an intent in the intent database.

In some embodiments, the method 420 further comprises: in response to multiple prediction distributions exceeding the preset threshold, determining that the audio input corresponds to multiple intents and applying a neural network model to divide the at least one of: the raw texts, the pre-processed text, the tokenized texts, or the vectorized texts correspondingly according to the multiple intents; and for each of the divided texts, applying the N-gram model to obtain the corresponding intent sub-classification.

In some embodiments, the method 420 further comprises: in response to determining that the intent classification and the intent sub-classification are consistent, extracting one or more entities from the tokenized texts; and in response to determining that the intent classification and the intent sub-classification are inconsistent, re-applying the one or more first machine learning models without the context of the current interface to the at least one of: the raw texts, the pre-processed text, the tokenized texts, or the vectorized texts to update the intent classification of the audio input.

At block 429, one or more entities may be identified from the tokenized text based on at least one of the intent classification, the intent sub-classification, or the second context. At block 430, contents associated with the one or more entities may be determined based on at least one of public data or personal data. At block 431, optionally, the query may be determined as an intent corresponding to at least one of the intent classification or the intent sub-classification, in association with the determined one or more entities and the determined contents.

FIG. 4C illustrates a flowchart of an example method 480, according to various embodiments of the present disclosure. The method 480 may be implemented in various environments including, for example, the environment 100 of FIG. 1. The example method 480 may be implemented by one or more components of the system 102 (e.g., the processor 104, the memory 106). The example method 480 may be implemented by multiple systems similar to the system 102. The operations of method 480 presented below are intended to be illustrative. Depending on the implementation, the example method 480 may include additional, fewer, or alternative steps performed in various orders or in parallel.

At block 482, an audio input may be obtained from the computing device, wherein the audio is inputted to the computing device when a first interface of the computing device is active. At block 484, a context of the first interface may be determined, the first interface comprising an interface associated with media, an interface associated with navigation, or an interface associated with messaging. At block 486, the audio input and the context of the first interface may be fed to one or more algorithms to determine an audio instruction associated with the audio input. At block 488, a computing device instruction may be transmitted to the computing device based on the determined audio instruction, causing the computing device to execute the computing device instruction.

The block 488 may comprise block 492, block 494, block 496, and block 498. At block 492, in response to determining that the audio instruction is empty, a first dialog may be generated based on the context of the first interface, causing the computing device to play the first dialog. At block 494, in response to determining that the audio instruction comprises an entity, the entity may be extracted, and a second dialog may be generated based on the extracted entity, causing the computing device to play the second dialog. At block 496, in response to determining that the audio instruction comprises a response, the response may be matched with a response database, and in response to detecting a matched response in the response database, the computing device may be caused to execute the matched response. At block 498, in response to determining that the audio instruction comprises a query, the query may be matched with a query database, and in response to detecting no matched query in the query database, the audio input and the context of the first interface may be fed to the one or more of algorithms to determine an audio instruction associated with the query. The block 498 may further comprise the method 330 or 420 described above.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
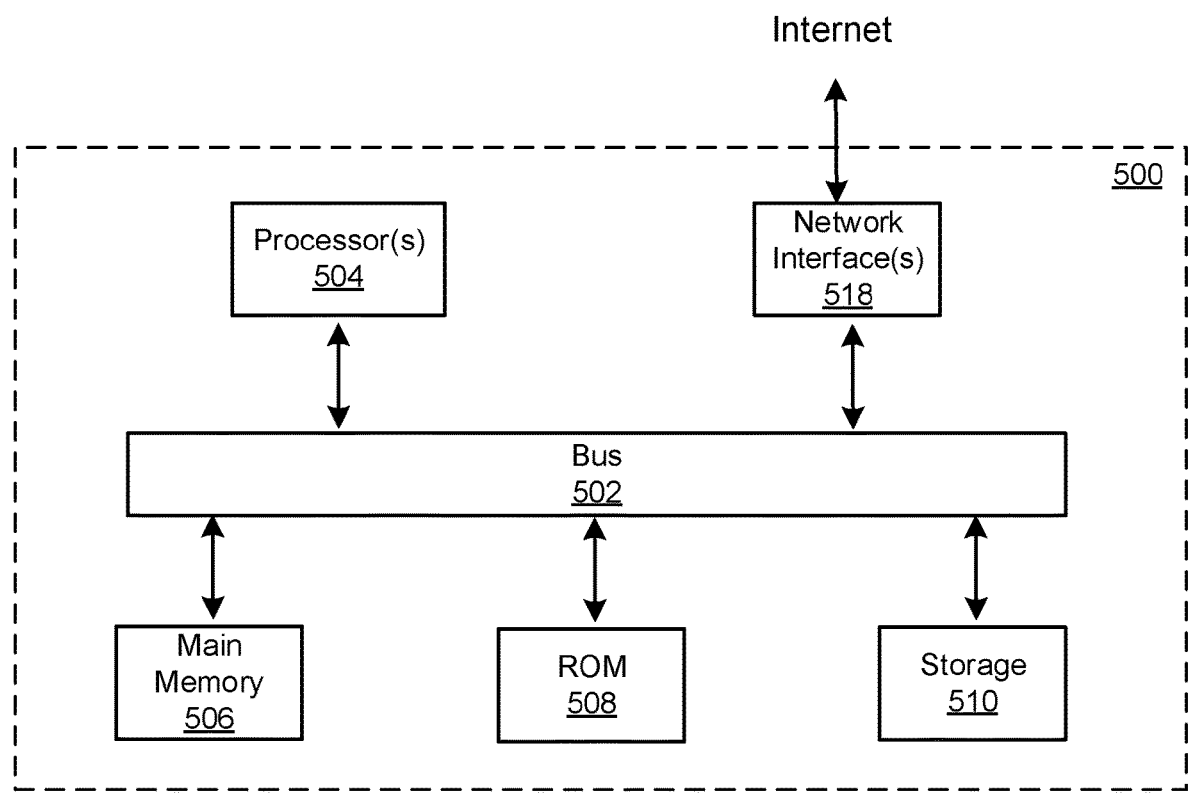
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm or model. In some embodiments, a machine learning algorithm or model may not explicitly program computers to perform a function, but can learn from training data to make a predictions model (a trained machine learning model) that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for natural language processing, implementable by a server, the method comprising:
    obtaining, from a computing device, an audio input and a current interface, wherein the current interface is associated with a context comprising a first context and a second context; and
    determining a query associated with the audio input based on the audio input and the context of the current interface by:
        feeding the audio input to a voice recognition engine to determine raw texts corresponding to the audio input;
        adjusting a weight in one or more first machine learning models based on the first context associated with the current interface;
        applying the one or more first machine learning models to the first context and to: the raw texts, pre-processed texts, tokenized texts, or vectorized texts, to obtain an intent classification of the audio input according to the weight, wherein the pre-processed texts, tokenized texts, and vectorized texts are associated with the raw texts;
        applying one or more second machine learning models to the second context and to: the raw texts, the pre-processed texts, the tokenized texts, or the vectorized texts to obtain one or more sub-classification prediction distributions of the audio input;
        comparing the one or more sub-classification prediction distributions with a preset threshold and against an intent database to obtain an intent sub-classification of the audio input, wherein the intent sub-classification corresponds to a sub-classification prediction distribution exceeding the preset threshold and matches an intent in the intent database; and
        determining the query based on the intent classification or the intent sub-classification of the audio input.

2. The method of claim 1, wherein:
    the computing device is configured to provide a plurality of inter-switchable interfaces;
    the plurality of interfaces comprise at least one of: an interface associated with navigation, an interface associated with media, or an interface associated with messaging;
    the first context comprises at least one of: the current interface as navigation, the current interface as media, or the current interface as messaging; and
    the second context comprises at least one of: an active route, a location, an active media session, or an active message.

3. The method of claim 1, wherein before applying the one or more first machine learning models to: the raw texts, pre-processed texts, tokenized texts, or vectorized texts, to obtain an intent classification of the audio input according to the weight, determining a query associated with the audio input based on the audio input and the context of the current interface further comprises:
    pre-processing the raw texts based on at least one of: lemmatizing, spell-checking, singularizing, or sentiment analysis to obtain the pre-processed texts;
    matching the pre-processed texts against preset patterns;
    in response to not detecting any preset pattern matching the pre-processed texts, tokenizing the pre-processed texts to obtain the tokenized texts; and
    vectorizing the tokenized texts to obtain the vectorized texts.

4. The method of claim 1, wherein adjusting a weight in one or more first machine learning models based on the first context associated with the current interface and applying the one or more first machine learning models to the first context and to: the raw texts, pre-processed texts, tokenized texts, or vectorized texts, to obtain an intent classification of the audio input according to the weight comprises:
    dynamically updating one or more weights in the one or more first machine learning models based on the first context.

5. The method of claim 1, wherein applying the one or more first machine learning models to the first context and to: the raw texts, the pre-processed texts, the tokenized texts, or the vectorized texts, to obtain an intent classification of the audio input comprises:
    applying a decision-tree-based model and a feedforward neural network model each to the first context and to: the raw texts, the pre-processed texts, the tokenized texts, or the vectorized texts to obtain corresponding output classifications;
    in response to determining that an output classification from the decision-tree-based model is the same as an output classification from the feedforward neural network model, using the either output classification as the intent classification of the audio input; and
    in response to determining that the output classification from the decision-tree-based model is different from the output classification from the feedforward neural network model, applying a directed acyclic graph-support vector machine (DAGSVM) model to: the raw texts, the pre-processed texts, the tokenized texts, or the vectorized texts to obtain the intent classification of the audio input.

6. The method of claim 1, wherein
    the one or more second machine learning models comprise: a naive bayes model, a term frequency-inverse document frequency model, a N-gram model, a recurrent neural network model, or a feedforward neural network model.

7. The method of claim 1, wherein determining a query associated with the audio input based on the audio input and the context of the current interface further comprises:
in response to multiple prediction distributions exceeding the preset threshold, determining that the audio input corresponds to multiple intents and applying a neural network model to divide: the raw texts, the pre-processed texts, the tokenized texts, or the vectorized texts correspondingly according to the multiple intents; and
for each of the divided texts, applying the N-gram model to obtain the corresponding intent sub-classification.

8. The method of claim 1, wherein determining a query associated with the audio input based on the audio input and the context of the current interface further comprises:
in response to determining that the intent classification and the intent sub-classification are consistent, extracting one or more entities from the tokenized texts; and
in response to determining that the intent classification and the intent sub-classification are inconsistent, re-applying the one or more first machine learning models without the context of the current interface to: the raw texts, the pre-processed texts, the tokenized texts, or the vectorized texts to update the intent classification of the audio input.

9. The method of claim 1, wherein determining a query associated with the audio input based on the audio input and the context of the current interface further comprises:
identifying one or more entities from the tokenized texts based on the intent classification, the intent sub-classification, or the second context;
determining contents associated with the one or more entities based on public data or personal data; and
determining the query as an intent corresponding to the intent classification or the intent sub-classification, in association with the determined one or more entities and the determined contents.

10. A system for natural language processing, implementable on a server, comprising a processor and a non-transitory computer-readable storage medium storing instructions that, when executed by the processor, cause the system to perform a method, the method comprising:
obtaining, from a computing device, an audio input and a current interface, wherein the current interface is associated with a context comprising a first context and a second context; and
determining a query associated with the audio input based on the audio input and the context of the current interface by:
feeding the audio input to a voice recognition engine to determine raw texts corresponding to the audio input;
adjusting a weight in one or more first machine learning models based on the first context associated with the current interface;
applying the one or more first machine learning models to the first context and to: the raw texts, pre-processed texts, tokenized texts, or vectorized texts, to obtain an intent classification of the audio input, wherein the pre-processed texts, tokenized texts, and vectorized texts are associated with the raw texts;
applying one or more second machine learning models to the second context and to: the raw texts, the pre-processed texts, the tokenized texts, or the vectorized texts to obtain one or more sub-classification prediction distributions of the audio input;
comparing the one or more sub-classification prediction distributions with a preset threshold and against an intent database to obtain an intent sub-classification of the audio input, wherein the intent sub-classification corresponds to a sub-classification prediction distribution exceeding the preset threshold and matches an intent in the intent database; and
determining the query based on the intent classification or the intent sub-classification of the audio input.

11. The system of claim 10, wherein:
the computing device is configured to provide a plurality of inter-switchable interfaces;
the plurality of interfaces comprise at least one of: an interface associated with navigation, an interface associated with media, or an interface associated with messaging;
the first context comprises at least one of: the current interface as navigation, the current interface as media, or the current interface as messaging; and
the second context comprises at least one of: an active route, a location, an active media session, or an active message.

12. The system of claim 10, wherein before applying the one or more first machine learning models to: the raw texts, pre-processed texts, tokenized texts, or vectorized texts, to obtain an intent classification of the audio input according to the weight, determining a query associated with the audio input based on the audio input and the context of the current interface further comprises:
pre-processing the raw texts based on at least one of: lemmatizing, spell-checking, singularizing, or sentiment analysis to obtain the pre-processed texts;
matching the pre-processed texts against preset patterns;
in response to not detecting any preset pattern matching the pre-processed texts, tokenizing the pre-processed texts to obtain the tokenized texts; and
vectorizing the tokenized texts to obtain the vectorized texts.

13. The system of claim 10, wherein adjusting a weight in one or more first machine learning models based on the first context associated with the current interface and applying the one or more first machine learning models to the first context and to: the raw texts, pre-processed texts, tokenized texts, or vectorized texts, to obtain an intent classification of the audio input according to the weight comprises:
dynamically updating one or more weights in the one or more first machine learning models based on the first context.

14. The system of claim 10, wherein applying the one or more first machine learning models to the first context and to: the raw texts, the pre-processed texts, the tokenized texts, or the vectorized texts, to obtain an intent classification of the audio input comprises:
applying a decision-tree-based model and a feedforward neural network model each to the first context and to: the raw texts, the pre-processed texts, the tokenized texts, or the vectorized texts to obtain corresponding output classifications;
in response to determining that an output classification from the decision-tree-based model is the same as an output classification from the feedforward neural network model, using the either output classification as the intent classification of the audio input; and
in response to determining that the output classification from the decision-tree-based model is different from the output classification from the feedforward neural network model, applying a directed acyclic graph-support vector machine (DAGSVM) model to: the raw texts, the pre-processed texts, the tokenized texts, or the vectorized texts to obtain the intent classification of the audio input.

15. The system of claim 10, wherein
the one or more second machine learning models comprise: a naive bayes model, a term frequency-inverse document frequency model, a N-gram model, a recurrent neural network model, or a feedforward neural network model.

16. The system of claim 10, wherein determining a query associated with the audio input based on the audio input and the context of the current interface further comprises:
  in response to multiple prediction distributions exceeding the preset threshold, determining that the audio input corresponds to multiple intents and applying a neural network model to divide: the raw texts, the pre-processed texts, the tokenized texts, or the vectorized texts correspondingly according to the multiple intents; and
  for each of the divided texts, applying the N-gram model to obtain the corresponding intent sub-classification.

17. The system of claim 10, wherein determining a query associated with the audio input based on the audio input and the context of the current interface further comprises:
  in response to determining that the intent classification and the intent sub-classification are consistent, extracting one or more entities from the tokenized texts; and
  in response to determining that the intent classification and the intent sub-classification are inconsistent, re-applying the one or more first machine learning models without the context of the current interface to: the raw texts, the pre-processed texts, the tokenized texts, or the vectorized texts to update the intent classification of the audio input.

18. The system of claim 10, wherein determining a query associated with the audio input based on the audio input and the context of the current interface further comprises:
  identifying one or more entities from the tokenized text based on the intent classification, the intent sub-classification, or the second context;
  determining contents associated with the one or more entities based on public data or personal data; and
  determining the query as an intent corresponding to the intent classification or the intent sub-classification, in association with the determined one or more entities and the determined contents.

19. A method for natural language processing, comprising:
  obtaining an audio input from a computing device, wherein the audio is inputted to the computing device when a first interface of the computing device is active;
  determining a context of the first interface, the first interface comprising an interface associated with media, an interface associated with navigation, or an interface associated with messaging, the context comprising a first context and a second context;
  feeding the audio input and the context of the first interface to one or more algorithms to determine an audio instruction associated with the audio input; and
  transmitting a computing device instruction to the computing device based on the determined audio instruction, causing the computing device to execute the computing device instruction,
  wherein feeding the audio input and the context of the first interface to one or more algorithms to determine an audio instruction associated with the audio input comprises:
    feeding the audio input to a voice recognition engine to determine raw texts corresponding to the audio input;
    adjusting a weight in one or more first machine learning models based on the first context associated with the current interface; and
    applying the one or more first machine learning models to the first context and to:
  the raw texts, pre-processed texts, tokenized texts, or vectorized texts, to obtain an intent classification of the audio input, wherein the pre-processed texts, tokenized texts, and vectorized texts are associated with the raw texts;
    applying one or more second machine learning models to the second context and to: the raw texts, the pre-processed texts, the tokenized texts, or the vectorized texts to obtain one or more sub-classification prediction distributions of the audio input;
    comparing the one or more sub-classification prediction distributions with a preset threshold and against an intent database to obtain an intent sub-classification of the audio input, wherein the intent sub-classification corresponds to a sub-classification prediction distribution exceeding the preset threshold and matches an intent in the intent database.

20. The method of claim 19, wherein transmitting the computing device instruction to the computing device based on the determined audio instruction, causing the computing device to execute the computing device instruction comprises:
  in response to determining that the audio instruction is empty, generating a first dialog based on the context of the first interface, causing the computing device to play the first dialog;
  in response to determining that the audio instruction comprises an entity, extracting the entity, and generating a second dialog based on the extracted entity, causing the computing device to play the second dialog;
  in response to determining that the audio instruction comprises a response, matching the response with a response database, and in response to detecting a matched response in the response database, causing the computing device to execute the matched response; and
  in response to determining that the audio instruction comprises a query, matching the query with a query database, and in response to detecting no matched query in the query database, feeding the audio input and the context of the first interface to the one or more of algorithms to determine an audio instruction associated with the query.

* * * * *